April 7, 1970  C. L. FRIESE  3,504,940
CONVERTIBLE SEAT

Original Filed June 5, 1967  2 Sheets-Sheet 1

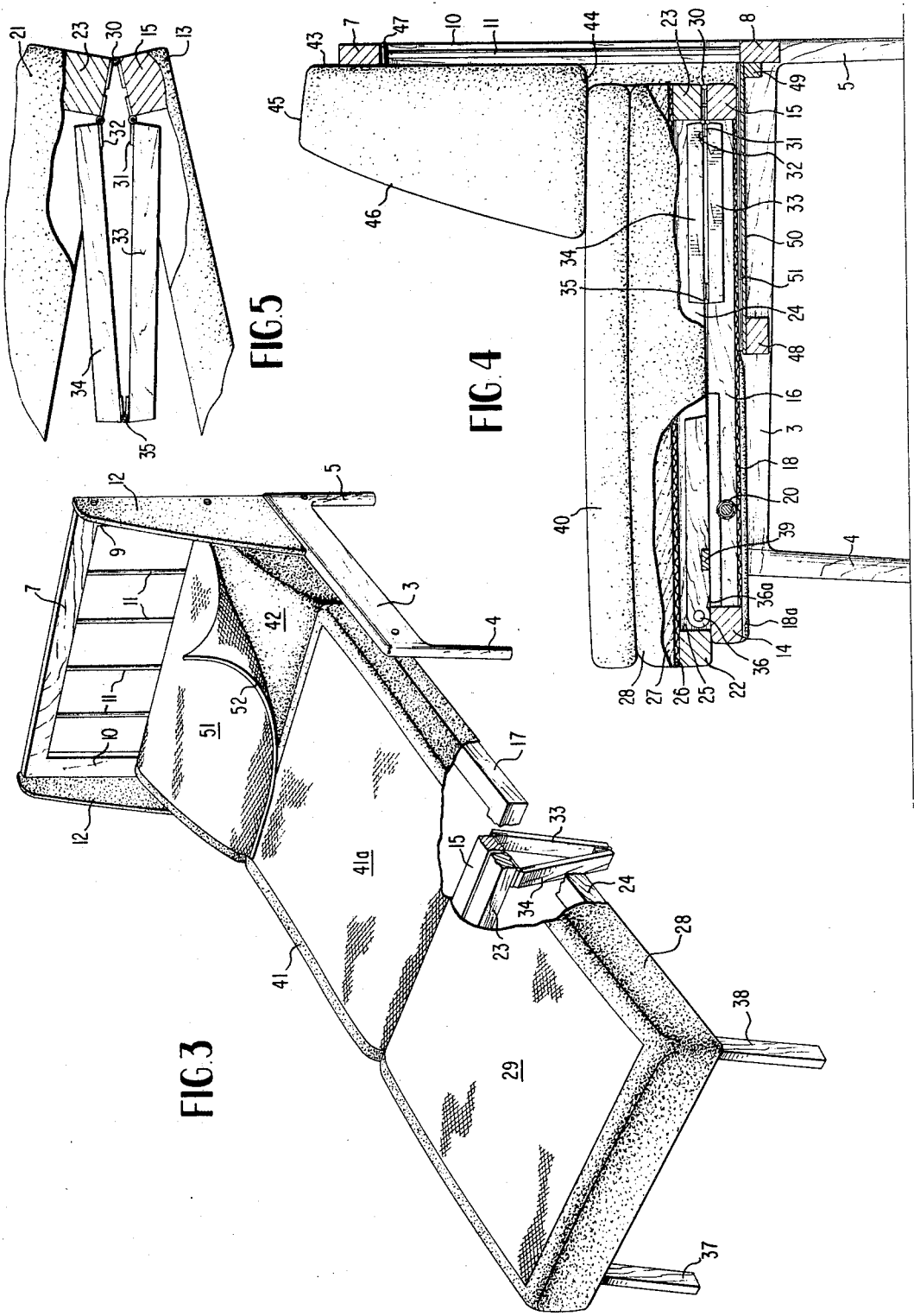

United States Patent Office 3,504,940
Patented Apr. 7, 1970

3,504,940
CONVERTIBLE SEAT
Carl Ludwig Friese, 200 Fort Meade Road,
Laurel, Md. 20810
Continuation of application Ser. No. 643,672, June 5,
1967. This application Mar. 21, 1969, Ser. No. 810,916
Int. Cl. A47c *13/00*
U.S. Cl. 297—105    16 Claims

ABSTRACT OF THE DISCLOSURE

A convertible seat made of three frame sections and a cushion that are pivotally secured to each other. The surfaces that are used as a seat are different from those surfaces used as a bed thereby avoiding double duty on a single surface. Further, one surface can be upholstered to resemble a seat and the other surface can be upholstered to resemble a bed. A bolster is shaped to serve as a back rest for the seat when used in that position, and doubles as a comfortable head rest when used in the bed position.

This invention relates to a seat that is adapted to be converted into a bed, and this application is a continuation of application Ser. No. 643,672, filed June 5, 1967, now abandoned.

Convertible seats that are presently made are large, heavy and too cumbersome for convenient use. They are usually constructed with many links and levers which make them costly.

An object of the invention is to provide a compact seat structure that is easily convertible to use as a bed.

Another object is to provide a convertible seat structure employing a minimum of moving parts and comprised of simple frames that are easy to fabricate.

An additional object of the invention is to provide a convertible seat whereby the surfaces that are slept on are additional to the surfaces that are sat on.

Still another object of the invention is to provide a bed surface that has a fold in such a position that the person's legs are supported in that region thereby allowing a surface uninterrupted by folds to support the back of the person sleeping on the bed. This arrangement tends to assimilate the comfort existing in a standard bed.

Other objects and advantages of the invention will become apparent during the course of the following description.

SUMMARY OF THE INVENTION

A chair constructed with a novel cushion supporting base which by simple manipulation can be extended to form a bed.

FIGURE 3 is a perspective view of the convertible seat extended into a bed position.

FIGURE 4 is a side elevational view of the convertible seat in the seat position with a partial sectional view showing the folding legs in their folded position.

FIGURE 5 is a partial side elevational view showing one of the folded leg structures partially open.

Figure 1:
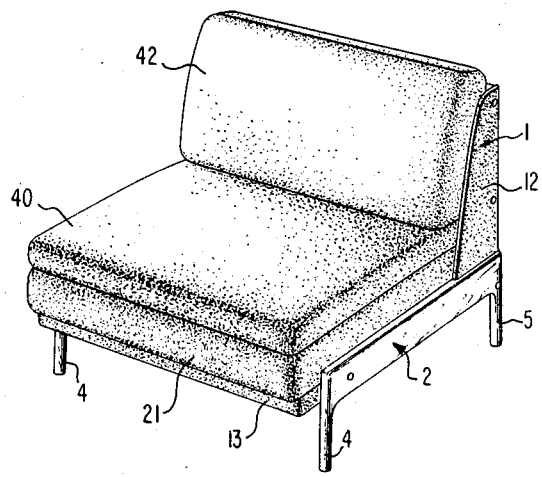
FIGURE 1 is a perspective view of the convertible seat in the seat position.

Referring now to the drawings, a convertible unit designated generally as 1 in FIGURE 1 comprises a first or main frame 2 which includes two parallel side portions 3 supported in front and rear by legs 4 and 5, respectively. First or main frame 2 also includes a back portion 6 consisting of top and bottom members 7 and 8 and sides 9 and 10 shown in FIGURE 3. A plurality of vertical rods 11 form the center of back portion 6. Wings 12 are attached to sides 9 and 10 of back portion 6.

A second frame 13 includes front and rear portions 14 and 15 and sides 16 and 17. The center portion of second frame 13 is open to receive a suitable spring means 18 and fabric covering 18a. Front portion 14 carries a foot plate 19 and sides 16 and 17 pivot about shaft 20. Shaft 20 in turn is pivotally secured to sides 3 adjacent legs 4 of first frame member 2.

A third frame member 21 includes front and rear portions 22 and 23 and sides 24 and 25 illustrated in FIGURE 4. The center portion of third frame 21 is open to receive a suitable spring 26 and cushion 27. Edge fabric 28 is upholstered with a fabric suitable for seating while the top surface is upholstered with a mattress fabric 29. Third frame 21 is connected to second frame 13 via hinge 30 shown in FIGURE 5. Adjacent hinge 30, hinges 31 and 32 connect each of the legs 33 and 34 at one end to second frame 13 and third frame 21, respectively. Each of the other ends of legs 33 and 34 are connected to each other via hinge 35. Sides 24 of third frame 21 each support a stud 36 located adjacent front portion 22. Studs 36 act as pivots for legs 37 and 38 while support 39 shown in FIGURE 2 spans between legs 37 and 38. Legs 37 and 38 each have a notch 36a on their front sides adjacent studs 36. The function of notches 36a will be explained later.

A cushion 40 has the same length and width as third frame 21 but it is not as thick since it only comprises a cushion covered on one side and the edges with seating fabric 41 and on the other side with mattress fabric 41a.

The edge fabric 28 of second frame 21 is sewed to the edge of cushion 40 whereby the mattress fabric of the cushion lies in the same plane as the mattress fabric 29 on second frame 21. Cushion 40 is now able to pivot along the seamed edge.

Bolster 42 shown in FIGURE 4 comprises a back portion 43 that lies normal to bottom portion 44. Top portion 45 is shorter in length than bottom portion 44 thereby allowing front portion 46 to be disposed at an angle of less than 90 degrees from bottom portion 44. The top and front 45 and 46 along with sides 46a and 46b have a covering matching the seating fabric of the side covering 28 on third frame 21. The back and bottom portions 43 and 44 are covered with the same mattress fabric used on cushion 40 and second frame 21. Back side 43 carries two prongs 47 that outwardly extend normal thereto and frictionally engage the underside of top member 7 of back portion 6 when bolster 42 is in the seat position shown in FIGURE 4 thereby holding bolster 42 in position.

First frame 2 is strengthened by a center brace 48 that extends between sides 3 at about their midpoint. Back brace 49 extends between sides 3 and both braces 48 and 49 further act to support panel 50. Panel 50 functions to support bolster cover 51. Bolster cover 51 is secured to the back edge of panel 50. Bolster cover 51 extends over bolster 42 when the bolster is in the bed position and acts as a head rest. The free end 52 of bolster cover 51 is looped around a plurality of beads (not shown) that can be tucked between the edge of cushion 40 and top side 45 of bolster 42.

Figure 2:
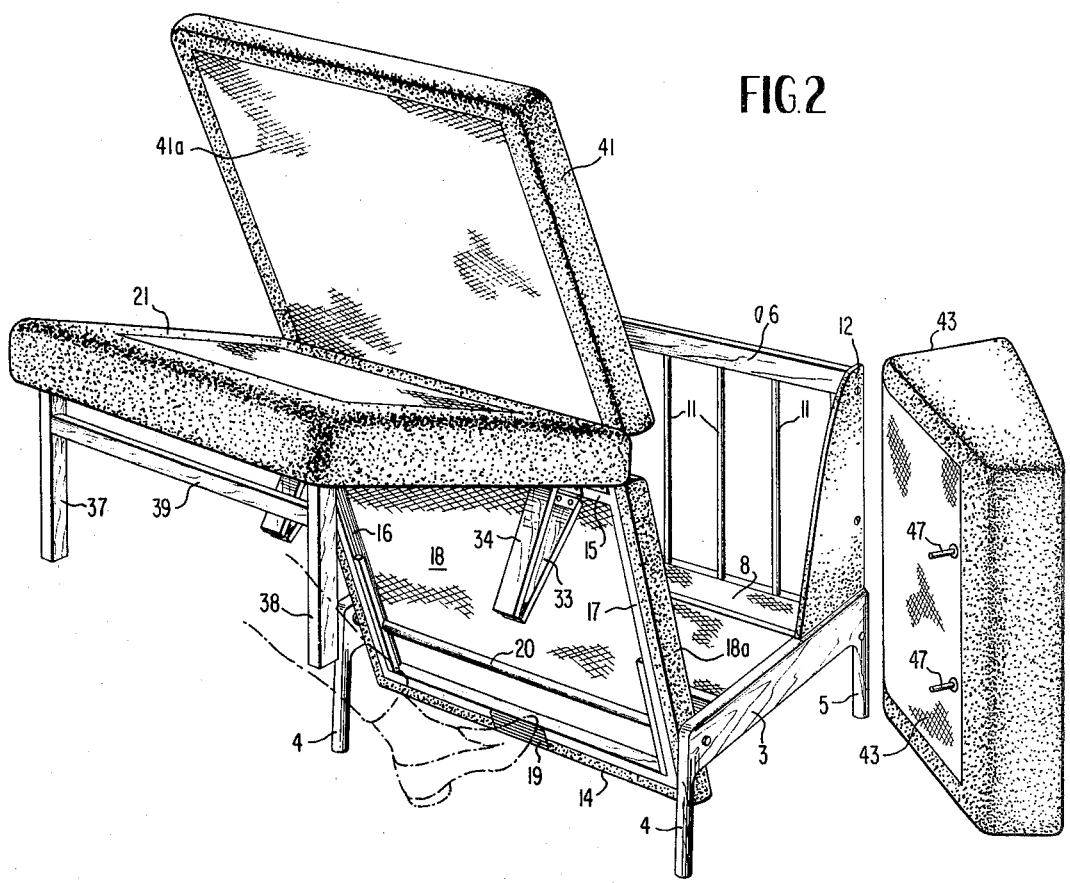
FIGURE 2 is a perspective view of the convertible seat shown in a partially open position with a cutaway portion showing one of the folded leg structures.

If one would desire to convert the seat to a bed the following steps would be taken: First, bolster 42 is removed. Then third frame 21 would be lifted by gripping front portion 22 in FIGURE 4 which extends past front portion 14 of second frame 13. One would then place his foot on foot plate 19 and pivot second frame 3 about shaft 20 as shown in FIGURE 2. Legs 33 and 34 tend to unfold themselves and legs 37 and 38 tend to fall away from their nested position within third frame 21. Legs 37 and 38 fall until notches 36a contact front portion 22 and act to seat the legs in place. When all the legs are resting on the floor, cushion 40 is then pivoted away from third frame 21 towards second frame 13 until cushion 40 rests directly on top of third frame 13 as shown in FIGURE 3. Bolster 42 is now put in place with bottom side 44 resting against back portion 6 and with front portion 46 facing upwards. Bolster cover 51 is tucked between bolster 42 and cushion 40.

To convert the bed back to a seat, bolster cover 51 is removed from bolster 42 and bolster 42 is removed from the bed. Cushion 40 is pivoted onto third frame 21. Third frame 21 is lifted at front portion 22 thereby pivoting third frame 21 and second frame 13 together about shaft 20. Third frame 21 is then pivoted onto second frame 13 about hinges 30. Legs 33 and 34 nest between second frame 13 and third frame 21, as shown in FIGURE 5, while legs 37 and 38 nest into third frame 21 by gravity. Third frame 21 continues to move directly over second frame 13 until the first, second and third frames 2, 13, and 21 rest directly on top of each other along with cushion 40. Bolster cover 51 is dropped onto panel 50 and bolster 42 is placed on cushion 40 in the back rest position shown in FIGURE 4 with prongs 47 frictionally engaging top side 7 of back portion 6.

It is to be understood that the device can be made approximately twice as wide in the form of a full size sofa and double bed whereby the bolster could be in one piece used with a single seat or with two separate seats. Conversely, two bolsters could be used with two separate seats or a single seat.

The embodiments of the invention in which an exclusive property or privilege is claimed are defined as follows:

1. A convertible seat comprising a first frame means including side portions and a rear portion, first leg means supporting said first frame means, a second frame means, said second frame means adjacent one end pivotally connected opposite the rear portion to said first frame means, a third frame means, said third frame means having a front and back, said back pivotally connected to the other end of said second frame means, a cushion means, said cushion means also pivotally connected to the back of said third frame means, second leg means, said second leg means pivotally connected to the other end of said second frame means and to the back of the third frame means, third leg means, said third leg means connected to the front of said third frame means, whereby the first, second and third frame means can be stacked one on top of the other with the cushion means resting on the third frame means to form a seat and the first, second and third frame means can be extended end for end to form a bed with the cushion means resting on the second frame means.

2. The arrangement of claim 1 wherein the cushion means comprises two surfaces, one surface accommodating a seat and the other surface accommodating one portion of the surface for the bed.

3. The arrangement of claim 1 wherein the cushion means and the third frame means have substantially the same length and width and the second frame means has substantially the same width as the cushion means and the third frame means but the length of the second frame means is shorter than the length of the cushion means and the third frame means whereby when they are stacked one on top of the other to form a seat the cushion means and third frame means extend past the one end of the second frame means thereby facilitating a grip for pivoting the third frame means and cushion means relative to the second frame means.

4. The arrangement of claim 2 wherein the third frame means has an upper surface accommodating another portion of the surface for the bed.

5. The arrangement of claim 1 comprising a bolster, said bolster having a bottom portion, a top portion, a back portion, a front portion, and two sides, said back portion being disposed normal to the bottom portion, said top portion extending outwardly from the back portion a shorter distance than the bottom portion whereby when the bolster sets upright on the cushion means and against the rear portion of the first frame means the front portion acts as a back rest for the seat and when the back portion of the bolster rests on the first frame means with the bottom portion against the rear portion of the first frame means, the bolster acts as a head rest.

6. The arrangement of claim 5 comprising a bolster cover, said bolster cover having one end secured adjacent the rear portion of the frame means whereby the bolster cover extends over the bolster when the bolster forms a portion of the bed.

7. The arrangement of claim 5 comprising prong means, said prong means located adjacent the top end of the rear portion of the bolster thereby frictionally engaging the rear portion of the first frame means when the bolster acts as a back rest.

8. The arrangement of claim 1 wherein the second leg means comprises a first member and second member, said first and second members being pivotally connected to each other at one end, said first member being pivotally connected to the other end of said second frame means while the second member is pivotally connected to the back portion of the third frame means.

9. The arrangement of claim 3 wherein the second frame means comprises a top and bottom surface, the top surface being adapted to receive the cushion means when the cushion means is used for a portion of the bed, a foot plate, said foot plate secured to the bottom surface of the second frame means adjacent one end thereof.

10. An extensible support comprising a main frame, a first frame normally disposed substantially within the confines of the main frame, means connecting said first frame to said main frame for moving said first frame outwardly of said main frame, and a second frame normally disposed substantially within the confines of said main frame and in a superposed relation with respect to said first frame, means connecting said second frame to said first frame for movement outwardly therefrom whereby when the first and second frames are moved outwardly they will cooperate with one another and with said main frame to form an elongated support, said second frame supporting a cushion comprised of a main cushion secured directly thereto and a second cushion pivoted to said main cushion whereby the same may be flipped rearwardly to cover said first frame in said extended position.

11. An extensible support comprising a main frame, a first frame normally disposed substantially within the confines of the main frame, means connecting said first frame to said main frame for moving said first frame outwardly of said main frame, and a second frame normally disposed substantially within the confines of said main frame and in a superposed relation with respect to said first frame, means connecting said second frame to said first frame for movement outwardly therefrom whereby when the first and second frames are moved outwardly they will cooperate with one another and with said main frame to form an elongated support, a bolster means which in the superposed position of the frames rests on the topmost frame within the confines of the main frame and which is inserted between the opening formed between the first frame and the main frame when the first and second frames are in said extended position, said bolster having a bottom portion, a top portion, a back portion, a front portion, and two sides, said back portion being disposed normal to the bottom portion, said top portion extending outwardly from the back portion a shorter distance than the bottom portion whereby when the bolster sets upright on the cushion means and against the rear portion of the first frame means the front portion acts as a back rest for the seat and when the back portion of the bolster rests on the first frame means in said opening with the bottom portion against the rear portion of the first frame means, the bolster acts as a head rest.

12. The arrangement of claim 11, further including a first set of cooperating legs disposed between said first and second frames, said leg means being collapsed when said first and second frames are in said superposed relation and opened when said frames are moved outwardly to form said elongated support, and second leg means supporting the forward portion of said second frame.

13. The arrangement of claim 12, wherein said first set of legs comprises a first member and a second member, said first and second members being pivotally connected to each other at one end and the free ends being connected to each of said frames respectively.

14. The arrangement of claim 10, further including a first set of cooperating legs disposed between said first and second frames, said leg means being collapsed when said first and second frames are in said superposed relation and opened when said frames are moved outwardly to form said elongated support, and second leg means supporting the forward portion of said second frame.

15. The arrangement of claim 14, wherein said first set of legs comprises a first member and a second member, said first and second members being pivotally connected to each other at one end and the free ends being connected to each of said frames respectively.

16. The arrangement of claim 10, wherein a bolster is provided which in the superposed position of the frames rests on the topmost frame within the confines of the main frame and which is inserted between the opening formed between the first frame and the main frame when the first and second frames are in said extended position.

References Cited

UNITED STATES PATENTS

| | | | |
|---|---|---|---|
| 1,344,825 | 6/1920 | Schram | 5—57 X |
| 2,187,713 | 1/1940 | Bowersox | 297—111 |
| 2,635,674 | 4/1953 | Pelliccione | 297—109 |
| 2,698,648 | 1/1955 | Kronheim | 297—110 |
| 3,145,049 | 8/1964 | Duke | 297—105 |

FOREIGN PATENTS

| | | |
|---|---|---|
| 449,460 | 9/1927 | Germany. |
| 571,064 | 2/1933 | Germany. |
| 422,178 | 1/1947 | Italy. |
| 35,193 | 12/1911 | Sweden. |
| 88,892 | 3/1937 | Sweden. |

JAMES T. McCALL, Primary Examiner

U.S. Cl. X.R.

297—109